US012335096B2

(12) United States Patent
Kumar (10) Patent No.: US 12,335,096 B2
(45) Date of Patent: Jun. 17, 2025

(54) MULTI-LEVEL CHANGE REQUEST RISK ASSESSMENT SYSTEM AND METHOD

(71) Applicant: RAKUTEN MOBILE, INC., Tokyo (JP)

(72) Inventor: Ravish Kumar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/798,789

(22) PCT Filed: Jul. 11, 2022

(86) PCT No.: PCT/US2022/036649
§ 371 (c)(1),
(2) Date: Aug. 10, 2022

(87) PCT Pub. No.: WO2024/015044
PCT Pub. Date: Jan. 18, 2024

(65) Prior Publication Data
US 2024/0195694 A1    Jun. 13, 2024

(51) Int. Cl.
*G06F 15/16* (2006.01)
*H04L 41/0604* (2022.01)
(Continued)

(52) U.S. Cl.
CPC ...... *H04L 41/0894* (2022.05); *H04L 41/0609* (2013.01); *H04W 12/67* (2021.01)

(58) Field of Classification Search
CPC ............. H04L 41/0894; H04L 41/0609; H04L 41/082; H04L 41/0813; H04W 12/67;
(Continued)

(56) References Cited

U.S. PATENT DOCUMENTS

2010/0191952 A1* 7/2010 Keinan .................. G06Q 10/06
713/100
2013/0204837 A1* 8/2013 Sabharwal ............ G06F 16/235
707/E17.005

(Continued)

OTHER PUBLICATIONS

International Search Report dated Nov. 4, 2022 issued by the International Searching Authority in Application No. PCT/US2022/036649.

(Continued)

*Primary Examiner* — Suraj M Joshi
*Assistant Examiner* — Hao H Nguyen
(74) *Attorney, Agent, or Firm* — Sughrue Mion, PLLC (57) ABSTRACT

A method for assessing risk for a change request in a mobile communications system and network includes receiving a first user input from a user for creating the change request, determining a level of the change request, from among a plurality of predetermined levels associated with the mobile communications system, determining a risk assessment form corresponding to the determined level of the change request, from among a plurality of predetermined risk assessment forms respectively corresponding to the plurality of predetermined levels, wherein each of the plurality of predetermined risk assessment forms calculates a risk differently based on the plurality of predetermined levels, outputting the determined risk assessment form to the user, receiving, from the user, a second user input regarding the change request to the risk assessment form, and determining a risk level of the change request based on the second user input.

18 Claims, 6 Drawing Sheets

(51) Int. Cl.
*H04L 41/0894* (2022.01)
*H04W 12/67* (2021.01)

(58) Field of Classification Search
CPC ...... H04W 12/08; G06F 16/23; G06F 16/235; G06F 8/65
See application file for complete search history.

(56) References Cited

U.S. PATENT DOCUMENTS

| | | | |
|---|---|---|---|
| 2013/0311224 A1* | 11/2013 | Heroux | G06Q 30/018 705/7.15 |
| 2016/0373478 A1* | 12/2016 | Doubleday | G06F 8/65 |
| 2017/0098221 A1* | 4/2017 | Rai | G06Q 50/2057 |
| 2017/0147961 A1* | 5/2017 | Haas | G06Q 10/063112 |
| 2018/0004961 A1* | 1/2018 | Gil | G06F 21/577 |
| 2018/0295148 A1* | 10/2018 | Mayorgo | H04L 63/105 |
| 2019/0068598 A1* | 2/2019 | Kang | H04L 41/0894 |
| 2019/0108465 A1* | 4/2019 | Zhou | G06Q 10/06375 |
| 2020/0153821 A1* | 5/2020 | Cao | H04L 63/0861 |
| 2021/0029137 A1* | 1/2021 | Wright | H04L 63/08 |
| 2022/0171921 A1* | 6/2022 | Pelta | G06Q 10/0635 |
| 2022/0318869 A1* | 10/2022 | Barday | G06Q 10/0635 |
| 2023/0020353 A1* | 1/2023 | Lautz | G16H 50/30 |

OTHER PUBLICATIONS

Written Opinion dated Nov. 4, 2022 issued by the International Searching Authority in Application No. PCT/US2022/036649.

\* cited by examiner

Change Request Type:

[ Type 1 ]     [ Type 2 ]     [ Type 3 ]

Question 1:

◎ Answer 1    ◎ Answer 2    ◎ Answer 3    ◎ Answer 4

Question 2:

◎ Yes    ◎ No

Question 3:

◎ Answer 1    ◎ Answer 2    ◎ Answer 3

Question 4:

◎ Yes    ◎ No

Question 5:

◎ Yes    ◎ No

[ Submit ]

FIG. 6

Change Request Type: Change radio access component

Change Request Level: Domain Level

Risk Level: Extreme High

Change Request Summary:
- Answer to question 1
- Answer to question 2, etc

Reject                                    Approve

MULTI-LEVEL CHANGE REQUEST RISK ASSESSMENT SYSTEM AND METHOD

CROSS REFERENCE TO RELATED APPLICATIONS

This application is a National Stage of International Application No. PCT/US2022/036649, filed Jul. 11, 2022.

FIELD

Apparatuses and methods consistent with example embodiments of the present disclosure relate to risk assessment of a change request in a telecommunication network.

DESCRIPTION OF RELATED ART

In the related art, whenever a change is requested to be made in a telecommunications network, the risk of a negative impact on network performance must be assessed to determine whether to approve the requested change. For example, if installing a network component might result in outages across the network, then the change request may be rejected.

A related art change management system deploys a single, network level change request (CR) risk assessment algorithm or approach. Thus, by way of example, the same risk assessment will be applied to both a change request for installing a network component and a change request for site maintenance. That is, in the related art, a uniform approach is applied to all CRs regardless of the network level. As such, a system user does not have the ability to provide or implement a variety of CR risk assessment algorithms or approaches corresponding to the variety of network levels.

SUMMARY

According to embodiments, systems and methods are provided allowing users to specify the parameters and algorithms for determining risk of different levels or types of change requests, thereby providing a risk assessment tailored and appropriate for each type of change request.

According to embodiments, a method, performed by at least one processor, for assessing risk for a change request in a mobile communications system, includes: receiving a first user input from a user for creating the change request; determining a level of the change request, from among a plurality of predetermined levels associated with the mobile communications system; determining a risk assessment form corresponding to the determined level of the change request, from among a plurality of predetermined risk assessment forms respectively corresponding to the plurality of predetermined levels, wherein each of the plurality of predetermined risk assessment forms calculates a risk differently based on the plurality of predetermined levels; outputting the determined risk assessment form to the user; receiving, from the user, a second user input regarding the change request to the risk assessment form; and determining a risk level of the change request based on the second user input.

The plurality of predetermined risk assessment forms are a plurality of predetermined questionnaires respectively corresponding to the plurality of predetermined levels; each of the plurality of predetermined questionnaires includes a plurality of questions; each of the plurality of questions has a plurality of selectable answers; and the plurality of selectable answers are respectively mapped to a plurality of risk scores.

The receiving the second user input includes receiving, for the plurality of questions included in the determined risk assessment form, answers from among the plurality of selectable answers.

The determining the risk level includes: determining risk scores mapped to the received answers; and calculating a total risk score based on the determined risk scores.

The calculating the total risk score includes summing the determined risk scores.

The first input indicates a type of the change request; and the determining the risk assessment form includes: determining whether the type of the change request is among a plurality of predetermined types of change requests; and determining the risk assessment form from among the plurality of predetermined risk assessment forms based on the determined type of the change request not being among the plurality of predetermined types of change requests.

The plurality of predetermined types of change requests include a software upgrade, a software change, a site management.

The plurality of predetermined levels include a network level, a domain level, a vendor level, and a network element level.

According to embodiments, a method, performed by at least one processor, for configuring a customized risk assessment questionnaire, includes, for each of a plurality of risk assessment questionnaires respectively corresponding to a plurality of types of change requests: receiving a first user input identifying a type of a change request for a corresponding risk assessment questionnaire, among the plurality of risk assessment questionnaires; receiving a second user input generating one or more questions for the corresponding risk assessment questionnaire; receiving a third user input selecting a plurality of selectable answers for each of the one or more questions, wherein each of the plurality of selectable answers are assigned and mapped to a plurality of risk scores; and storing the corresponding risk assessment questionnaire, wherein the plurality of types of change requests respectively correspond to a plurality of predetermined levels associated with a mobile communications network.

The risk assessment questionnaire includes: a minimum of five questions; and a maximum of ten questions, wherein the sum of the plurality of risk scores associated with each question is assigned to one of a plurality of risk levels including an extreme low level, a low level, a medium level, a high level and an extreme high level.

According to embodiments, an apparatus for assessing risk for a change request in a mobile communications system, includes: a memory storing instructions; and at least one processor configured to execute the instructions to: receive a first user input from a user for creating the change request; determine a level of the change request, from among a plurality of predetermined levels associated with the mobile communications system; determine a risk assessment form corresponding to the determined level of the change request, from among a plurality of predetermined risk assessment forms respectively corresponding to the plurality of predetermined levels, wherein each of the plurality of predetermined risk assessment forms calculates a risk differently based on the plurality of predetermined levels; output the determined risk assessment form to the user; receive, from the user, a second user input regarding the change request to the risk assessment form; and determine a risk level of the change request based on the second user input.

The plurality of predetermined risk assessment forms is a plurality of predetermined questionnaires respectively corresponding to the plurality of predetermined levels; each of the plurality of predetermined questionnaires includes a plurality of questions; each of the plurality of questions has a plurality of selectable answers; and the plurality of selectable answers are respectively mapped to a plurality of risk scores, wherein the receiving the second user input includes receiving, for the plurality of questions included in the determined risk assessment form, answers from among the plurality of selectable answers.

The determining the risk level includes: determining risk scores mapped to the received answers; and calculating a total risk score based on the determined risk scores, wherein the calculating the total risk score includes summing the determined risk scores.

The first input indicates a type of the change request; and the determining the risk assessment form includes: determining whether the type of the change request is among a plurality of predetermined types of change requests; and determining the risk assessment form from among the plurality of predetermined risk assessment forms based on the determined type of the change request not being among the plurality of predetermined types of change requests.

The plurality of predetermined types of change requests include a software upgrade, a software change, a site management.

According to embodiments, a non-transitory computer-readable recording medium has record thereon instructions executable by at least one processor to perform a method for assessing risk for a change request in a mobile communications system, the method including: receiving a first user input from a user for creating the change request; determining a level of the change request, from among a plurality of predetermined levels associated with the mobile communications system; determining a risk assessment form corresponding to the determined level of the change request, from among a plurality of predetermined risk assessment forms respectively corresponding to the plurality of predetermined levels, wherein each of the plurality of predetermined risk assessment forms calculates a risk differently based on the plurality of predetermined levels; outputting the determined risk assessment form to the user; receiving, from the user, a second user input regarding the change request to the risk assessment form; and determining a risk level of the change request based on the second user input.

The plurality of predetermined risk assessment forms is a plurality of predetermined questionnaires respectively corresponding to the plurality of predetermined levels; each of the plurality of predetermined questionnaires includes a plurality of questions; each of the plurality of questions has a plurality of selectable answers; and the plurality of selectable answers are respectively mapped to a plurality of risk scores, wherein the receiving the second user input includes receiving, for the plurality of questions included in the determined risk assessment form, answers from among the plurality of selectable answers.

The determining the risk level includes: determining risk scores mapped to the received answers; and calculating a total risk score based on the determined risk scores, wherein the calculating the total risk score includes summing the determined risk scores.

The first input indicates a type of the change request; and the determining the risk assessment form includes: determining whether the type of the change request is among a plurality of predetermined types of change requests; and determining the risk assessment form from among the plurality of predetermined risk assessment forms based on the determined type of the change request not being among the plurality of predetermined types of change requests, wherein the plurality of predetermined types of change requests includes a software upgrade, a software change, a site management.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and a system in which a user can create a change request (CR) and complete a risk assessment form corresponding to a level of that CR. As a result, time and cost inefficiencies can be reduced by providing the CR, corresponding to each of the CR levels, directly to the system user for further processing and approval.

Figure 1:
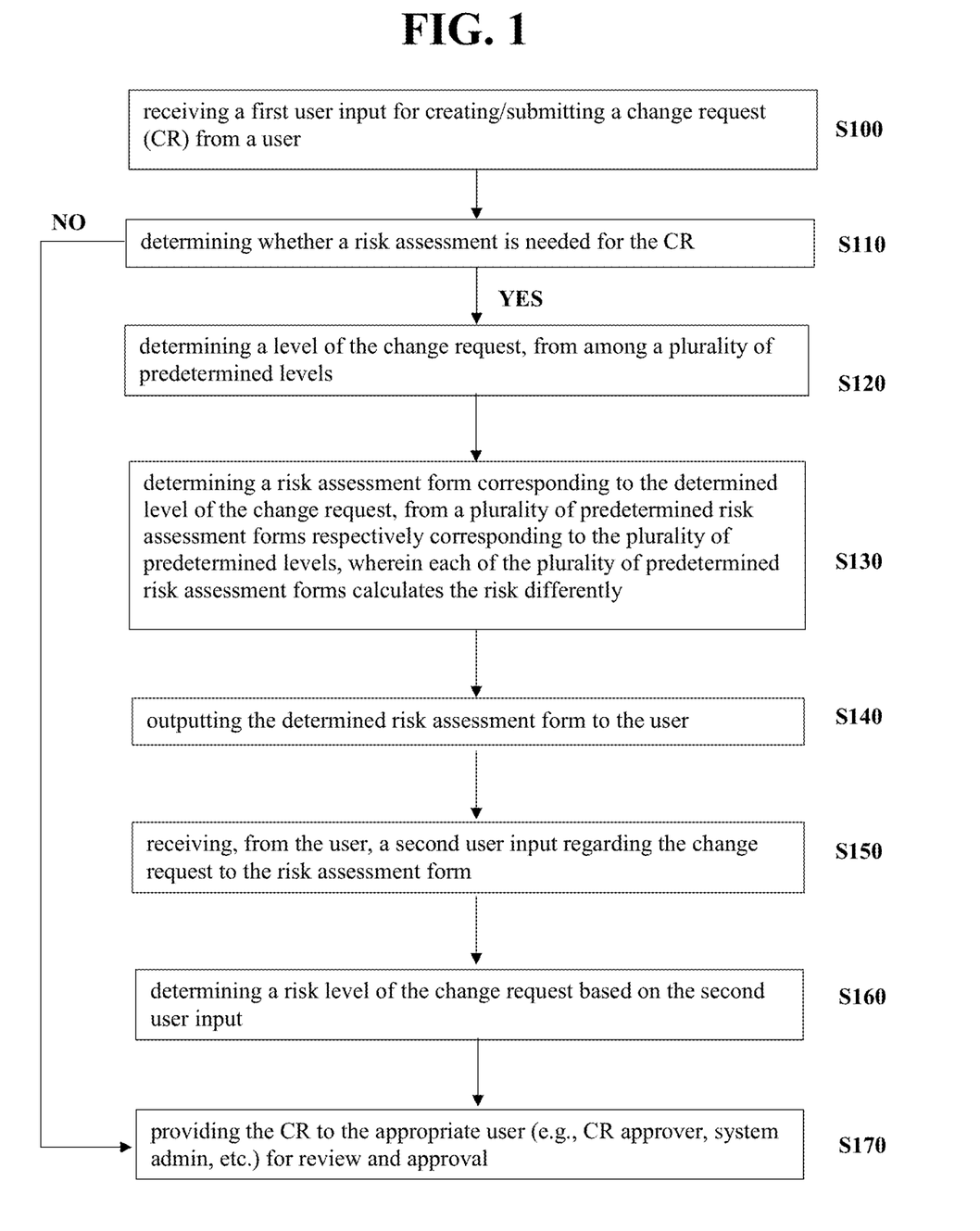
FIG. 1 is a flowchart of an example process for determining a level of change request (CR) and outputting a corresponding risk assessment form to a user, according to an example embodiment.

FIG. 1 is a flowchart of an example process for determining a level of change request (CR) and outputting a corresponding risk assessment form to a user, according to an embodiment. The process of FIG. 1 may be performed by an application or microservice for assessing risk of a change request submitted by a user.

Referring to FIG. 1, at S100, a first user input for creating or submitting a CR is received. The user may submit the first user input via a user interface. For example, the user interface (UI) outputs a CR application or request page for display on a display unit of the user device or user terminal that accesses the CR application, such as through a web browser over a network. According to another embodiment, the CR application may be displayed on a same device that stores and executes the CR application. According to another embodiment, the first user input may be an input that uploads or submits a previously or separately generated CR (e.g., including information on a requested change, in accordance with a predetermined CR form or application).

In S110, it is determined whether a risk assessment is needed for the CR application. To this end, the first user input may indicate the type of CR the user intends to submit. The "type" of CRs determines whether or not a risk assessment form (S130) corresponding to the CR is needed. In this regard, the method or system may be configured such that one or more predetermined types of CRs do not need a risk assessment. For example, in a case where a user's first user input indicates a CR for a software upgrade, the risk assessment form is not presented to the user since the risk of this type of CR is already known. The one or more predetermined types of CRs may be configured in advance, and may include at least one of software upgrades, software changes, site management, etc. If the type of CR is categorized within the one or more predetermined types of CR, a risk assessment form is not generated or provided. Rather, this type of CR will be provided directly to the appropriate user (e.g., CR approver, system admin, etc.) for review and for approval. That is, when it is determined at S110 that a CR is not needed (i.e., NO at S110), the method proceeds to S170, whereby the CR of the predetermined type is directly submitted for approval without a risk assessment being performed.

Next, when it is determined at S110 that a CR is needed (i.e., YES at S110), the method proceeds to S120. At S120, a level of the CR is determined from a plurality of predetermined levels. The predetermined levels refer to the plurality of different levels in a telecommunication network. For example, the levels may range from network level, domain level, sub-domain level, vendor level and network element level.

In S130, a risk assessment form corresponding to the determined level of CR is determined. A predetermined risk assessment form is created for each level of CR and stored respectively, as described for FIG. 4. Accordingly, each predetermined risk assessment form may calculate risk differently. Thus, when the level of CR has been determined, the corresponding predetermined risk assessment form is outputted to the user as the determined risk assessment form, in S140.

In S140, the determined risk assessment form is presented as a questionnaire with selectable answers for each of the questions in the questionnaire. Each questionnaire may range from a minimum of 5 questions and a maximum of 10 questions, though it is understood that other example embodiments are not limited thereto.

Once the user is presented with the determined risk assessment, a second user input is received in S150. The second user input indicates the selected answer from the variety of different selectable answers associated with each of the questions. In order to determine the risk level of the CR (S160), the user completes the questionnaire by providing a second user input in which an answer is selected for each of the questions in the questionnaire. In some embodiments, the user may complete the questions required to submit the CR and may opt out from answering optional questions.

Next, in S160, a risk level of the CR is determined based on the second user input. That is, each of the selectable answers presented for each of the questionnaire questions are assigned a risk score. In some embodiments, the risk scores may be mapped within a range of 1 to 5, where 1 is the lowest risk score and 5 is the highest risk score. The risk score is then used to calculate the risk level of the CR. In some embodiments, the risk level is calculated by summing the value of the risk scores corresponding to each of the selected answers for each of the questions presented in the risk assessment form. For example, the aggregated risk value for a questionnaire with 10 questions can have a maximum risk value of 50. Next, the risk scores are mapped to a plurality of risk levels, such as shown by way of example in TABLE 1.

TABLE 1

| Risk Levels | |
|---|---|
| Aggregate Risk Value | Risk Level |
| 10 | Extreme Low |
| 11 to 20 | Low |
| 21 to 30 | Medium |
| 31-40 | High |
| 41-50 | Extreme High |

As shown in TABLE 1, the risk levels in the present example incrementally range from "extreme low" to "extreme high", though it is understood that other example embodiments are not limited thereto. Accordingly, a higher risk level of a CR indicates a higher impact or influence that CR will have on the overall network. As such, CR with higher risk level will have a higher urgency to appropriately process and decide if such a CR should be approved or denied.

In S170, the CR alone (in a case where no risk assessment is needed per the determination of S110) or the CR with the determined risk level is provided to the appropriate user for review and for approval. In some embodiments, the appropriate user may be a CR approver, a system admin, system user, network level admin, etc. The system user reviews the provided summary of the first input or CR and determines whether to approve or reject, as exemplarily shown in FIG. 6.

Figure 2:
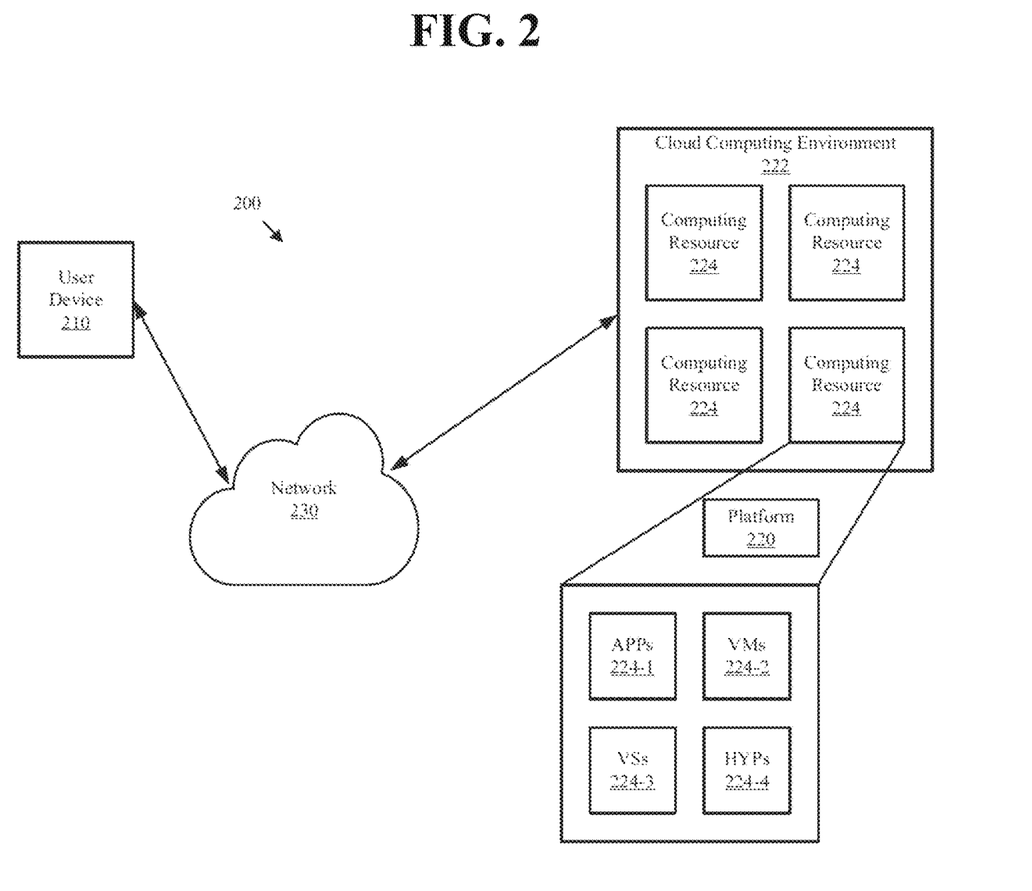
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above (or any of the functions and operations described in embodiments below) may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
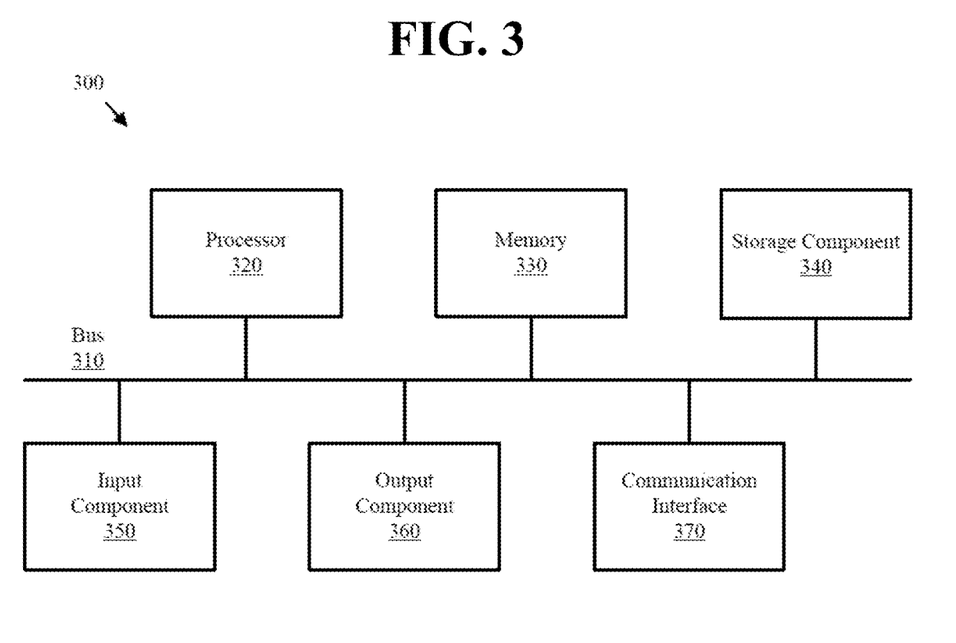
FIG. 3 is a diagram of example components of a device according to an embodiment.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)). Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In some embodiments, any one of the operations or processes of FIG. 1 or described in embodiments below may be implemented by or using any one of the elements illustrated in FIGS. 2-3.

Figure 4:
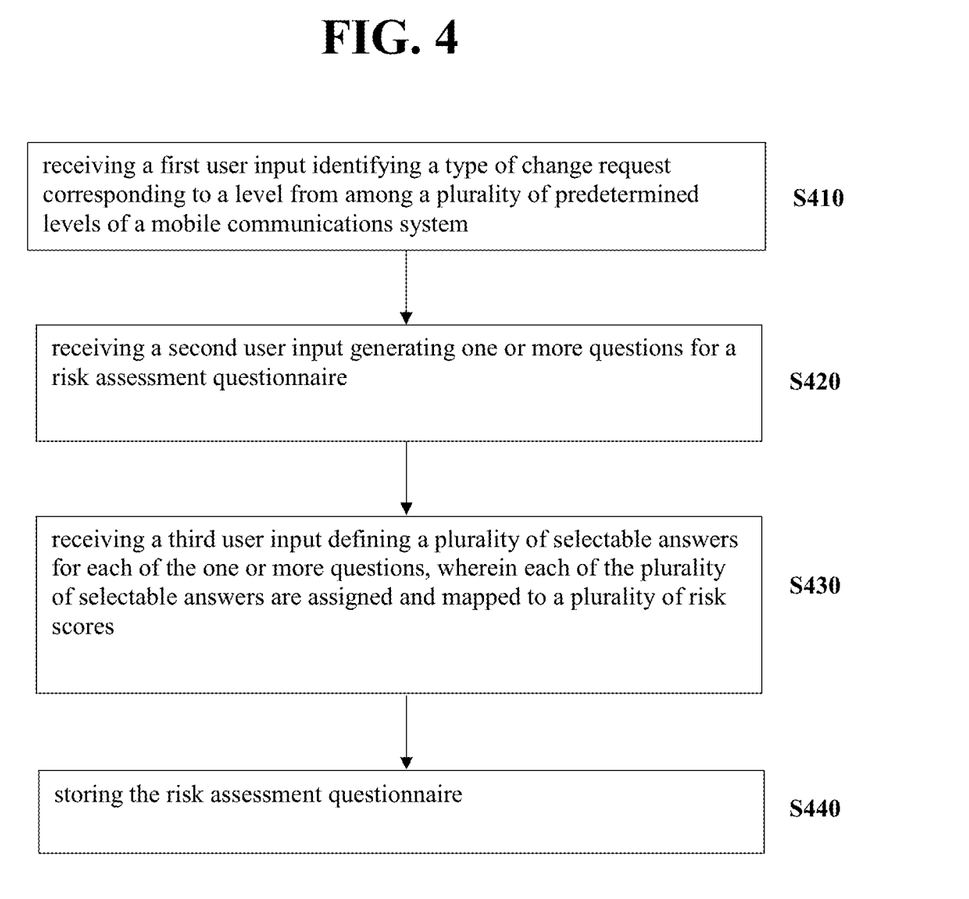
FIG. 4 is a flowchart of an example process for creating a customized risk assessment questionnaire corresponding to the plurality of levels of CRs.

In some embodiments, a system user can create or configure a customized risk assessment questionnaire (e.g., questionnaire form) corresponding to each of the plurality of levels of CRs. FIG. 4 is a flowchart of an example process for generating a risk assessment questionnaire. The method of FIG. 4 may be performed for each of a plurality of risk assessment questionnaires respectively corresponding to a plurality of types of change requests, where the plurality of types of change requests themselves may correspond respectively to a plurality of predetermined levels of a mobile communications network.

Referring to FIG. 4, in S410, the system user may input a first user input for identifying a type of change request. Here, the type may correspond to a level from among the plurality of predetermined levels described above.

In S420, at least one second user input is received for generating the questions of the risk assessment questionnaire. That is, the system user may input the desired questions (i.e., second user input) for the risk assessment questionnaire corresponding to the identified type. For example, the system user may input a minimum of five questions and a maximum of ten questions for each questionnaire, though it is understood that one or more other embodiments are not limited to this range. In some embodiments, the questions are multiple choice questions with different selectable answers. As such, the questions are used to better understand the situation or scenario in which a user is submitting a CR. For example, one question may ask for the urgency of the CR, while another may ask for the services affected. Therefore, by utilizing such questions, the system user may better prioritize the processing and approval of the various CRs submitted.

In S430, the system user inputs a variety of selectable answers for each question. Since the questions are multiple choice questions, the system user inputs multiple answer choices for each of the questions. For example, if a question asks whether the service of a domain level component is effected, the selectable answer choice may only include two options: yes and no. However, the number of selectable answer choices is not limited to two and may include more. Additionally, the system user assigns each of the selectable answer choices a risk score. For example, the risk score may vary from 1 to 5, where 5 is the highest risk score and 1 is the lowest risk score. By way of example, the customized questionnaire may include nine questions with multiple selectable answers assigned risk scores, as shown in TABLE 2.

TABLE 2

Questionnaire

| Question | (Answer) Multiple Choice Option | Risk Score |
| --- | --- | --- |
| Q1 | Yes | 5 |
|  | No | 1 |
| Q2 | Yes | 3 |
|  | No | 1 |
| Q3 | Number (1-100) | 1 |
|  | Number (101-500) | 2 |
|  | Number (501-750) | 3 |
|  | Number (751-1000) | 4 |
|  | Number >1000 | 5 |
| Q4 | Outage Min = 0 | 1 |
|  | Outage Min >1 <= 60 | 2 |
|  | Outage Min >60 <= 120 | 3 |
|  | Outage Min >120 <= 180 | 4 |
|  | Outage Min >180 <= 360 | 5 |
| Q5 | Yes | 5 |
|  | No | 1 |
| Q6 | Yes | 5 |
|  | No | 1 |
| Q7 | Yes | 5 |
|  | No | 1 |
| Q8 | Yes | 5 |
|  | No | 1 |
| Q9 | Yes | 5 |
|  | No | 1 |

It is understood that operations S420 and S430 may occur simultaneously (e.g., the selectable answers are defined for a first question, before proceeding to generation of a next question and its selectable answers), or may occur sequentially (e.g., all of the questions may first be defined before proceeding to define the selectable answers for each question). Further, it is understood that operation S410 may occur prior to, during, or after operations S420 and S430.

In S440, the customized questionnaire is stored. Accordingly, when a user indicates the level and type of CR requiring a risk assessment, the stored questionnaire corresponding to that same level of CR is presented for the user to complete. When the questionnaire has been presented and completed by the user, the risk scores are then used to calculate a risk level as described above with reference to S160 in FIG. 1.

Figure 5:
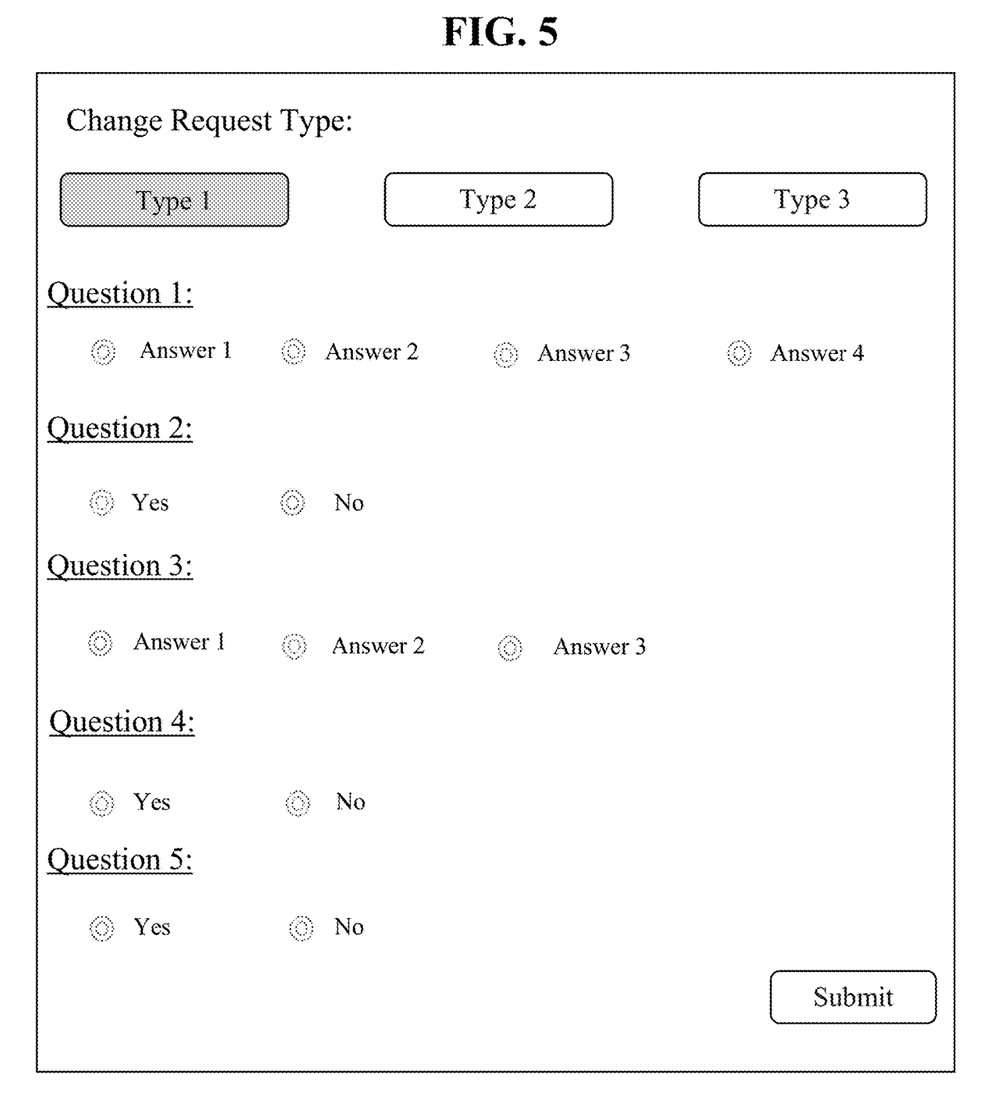
FIG. 5 is an example UI according to an embodiment.

FIG. 5 is an example UI according to an example embodiment. As shown in FIG. 5, the user is initially prompted to indicate the CR type. When the user selects a CR type requiring a risk assessment, the questionnaire corresponding to that CR is presented to the user. As such, the user may complete the questionnaire and submit the CR.

Figure 6:
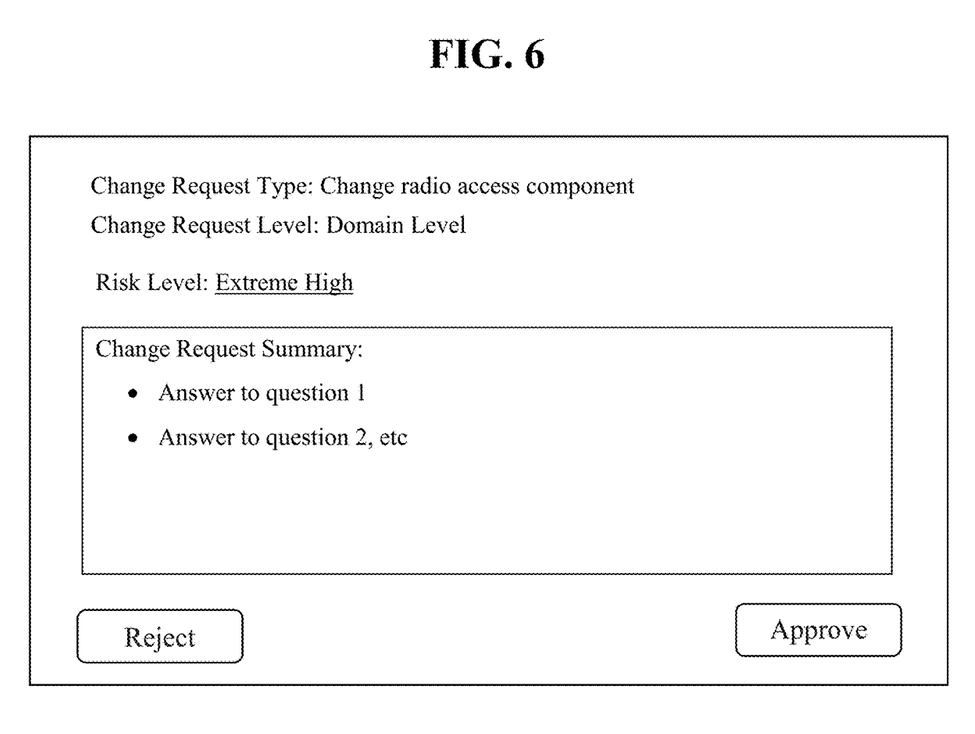
FIG. 6 is an example CR summary according to an embodiment.

FIG. 6 is an example CR risk assessment summary according to an example embodiment. Referring to FIG. 6, after a user submits a CR, the system user receiving the CR (for further processing or approval) may view a CR summary. For example, the CR summary may specify the type of CR, the level of CR, risk level and the answers selected for each of the questions in the questionnaire. The CRs with higher risk levels are prioritized for processing since they have a greater impact on the entire network and may compromise its safety and security. The system user (e.g., administrative user) may approve the CR or transfer the CR to another system user who may provide more appropriate service and processing. Additionally, the CRs summaries may be used to track the CRs corresponding to each level within a telecommunications network.

According to example embodiments, a customizable questionnaire specifying the parameters and algorithms is provided for determining risk of different levels or types of change requests. As a result, tailored change requests for the various levels of a telecommunication network may be implemented. Furthermore, because the change requests are network level specific, appropriate processing or approval may be provide more efficiently.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor, for assessing risk for a change request in a mobile communications system, the method comprising:
   receiving a first user input from a user for creating the change request;
   determining, based on a type of change request specified in the first user input, a level of the change request, from among a plurality of predetermined levels associated with the mobile communications system, each predetermined level from the plurality of predetermined levels corresponding to a different network level of the mobile communications system, the plurality of predetermined levels comprising a domain level, a sub-domain level, a vendor level, and a network element level;
   determining a risk assessment form corresponding to a respective network level of the determined level of the change request, from among a plurality of predetermined risk assessment forms respectively corresponding to the plurality of predetermined levels, wherein each of the plurality of predetermined risk assessment forms calculates a risk differently based on the plurality of predetermined levels;
   outputting the determined risk assessment form to the user;
   receiving, from the user, a second user input regarding the change request to the risk assessment form; and determining a risk level of the change request based on the second user input.

2. The method as claimed in claim 1, wherein:
the plurality of predetermined risk assessment forms are a plurality of predetermined questionnaires respectively corresponding to the plurality of predetermined levels;
each of the plurality of predetermined questionnaires includes a plurality of questions;
each of the plurality of questions has a plurality of selectable answers; and
the plurality of selectable answers are respectively mapped to a plurality of risk scores.

3. The method as claimed in claim 2, wherein the receiving the second user input comprises receiving, for the plurality of questions included in the determined risk assessment form, answers from among the plurality of selectable answers.

4. The method as claimed in claim 3, wherein the determining the risk level comprises:
determining risk scores mapped to the received answers; and
calculating a total risk score based on the determined risk scores.

5. The method as claimed in claim 4, wherein the calculating the total risk score comprises summing the determined risk scores.

6. The method as claimed in claim 1, wherein:
the first input indicates a type of the change request; and
the determining the risk assessment form comprises:
determining whether the type of the change request is among a plurality of predetermined types of change requests; and
determining the risk assessment form from among the plurality of predetermined risk assessment forms based on the determined type of the change request not being among the plurality of predetermined types of change requests.

7. The method as claimed 6, wherein the plurality of predetermined types of change requests comprises a software upgrade, a software change, and a site management.

8. An apparatus for assessing risk for a change request in a mobile communications system, the apparatus comprising:
a memory storing instructions; and
at least one processor configured to execute the instructions to:
receive a first user input from a user for creating the change request;
determine, based on a type of change request specified in the first user input, a level of the change request, from among a plurality of predetermined levels associated with the mobile communications system, each predetermined level from the plurality of predetermined levels corresponding to a different network level of the mobile communications system, the plurality of predetermined levels comprising a domain level, a sub-domain level, a vendor level, and a network element level;
determine a risk assessment form corresponding to a respective network level of the determined level of the change request, from among a plurality of predetermined risk assessment forms respectively corresponding to the plurality of predetermined levels, wherein each of the plurality of predetermined risk assessment forms calculates a risk differently based on the plurality of predetermined levels;
output the determined risk assessment form to the user;
receive, from the user, a second user input regarding the change request to the risk assessment form; and
determine a risk level of the change request based on the second user input.

9. The apparatus as claimed in claim 8, wherein:
the plurality of predetermined risk assessment forms is a plurality of predetermined questionnaires respectively corresponding to the plurality of predetermined levels;
each of the plurality of predetermined questionnaires includes a plurality of questions;
each of the plurality of questions has a plurality of selectable answers; and
the plurality of selectable answers are respectively mapped to a plurality of risk scores,
wherein the receiving the second user input comprises receiving, for the plurality of questions included in the determined risk assessment form, answers from among the plurality of selectable answers.

10. The apparatus as claimed in claim 8, wherein the at least one processor is configured to execute the instructions to:
determine risk scores mapped to the received answers; and
calculate a total risk score based on the determined risk scores, by summing the determined risk scores.

11. The apparatus as claimed in claim 8, wherein:
the first input indicates a type of the change request; and
the at least one processor is configured to execute the instructions to:
determine whether the type of the change request is among a plurality of predetermined types of change requests; and
determine the risk assessment form from among the plurality of predetermined risk assessment forms based on the determined type of the change request not being among the plurality of predetermined types of change requests.

12. The apparatus as claimed in claim 8, wherein the plurality of predetermined types of change requests comprises a software upgrade, a software change, and a site management.

13. A non-transitory computer-readable recording medium having record thereon instructions executable by at least one processor to perform a method for assessing risk for a change request in a mobile communications system, the method comprising:
receiving a first user input from a user for creating the change request;
determining, based on a type of change request specified in the first user input, a level of the change request, from among a plurality of predetermined levels associated with the mobile communications system, each predetermined level from the plurality of predetermined levels corresponding to a different network level of the mobile communications system, the plurality of predetermined levels comprising a domain level, a sub-domain level, a vendor level, and a network element level;
determining a risk assessment form corresponding to a respective network level of the determined level of the change request, from among a plurality of predetermined risk assessment forms respectively corresponding to the plurality of predetermined levels, wherein each of the plurality of predetermined risk assessment forms calculates a risk differently based on the plurality of predetermined levels;

outputting the determined risk assessment form to the user;

receiving, from the user, a second user input regarding the change request to the risk assessment form; and determining a risk level of the change request based on the second user input.

14. The non-transitory computer-readable recording medium according to claim 13, wherein:

the plurality of predetermined risk assessment forms is a plurality of predetermined questionnaires respectively corresponding to the plurality of predetermined levels;

each of the plurality of predetermined questionnaires includes a plurality of questions;

each of the plurality of questions has a plurality of selectable answers; and the plurality of selectable answers are respectively mapped to a plurality of risk scores.

15. The non-transitory computer-readable recording medium according to claim 14, wherein the receiving the second user input comprises receiving, for the plurality of questions included in the determined risk assessment form, answers from among the plurality of selectable answers.

16. The non-transitory computer-readable recording medium according to claim 15, wherein the determining the risk level comprises:

determining risk scores mapped to the received answers; and calculating a total risk score based on the determined risk scores, wherein the calculating the total risk score comprises summing the determined risk scores.

17. The non-transitory computer-readable recording medium according to claim 13, wherein:

the first input indicates a type of the change request; and the determining the risk assessment form comprises:

determining whether the type of the change request is among a plurality of predetermined types of change requests; and determining the risk assessment form from among the plurality of predetermined risk assessment forms based on the determined type of the change request not being among the plurality of predetermined types of change requests.

18. The non-transitory computer-readable recording medium according to claim 17, wherein the plurality of predetermined types of change requests comprises a software upgrade, a software change, and a site management.

* * * * *